May 22, 1962　　　R. C. HILLIARD　　　3,036,281
WAVE METER DRIVE MECHANISM
Filed Sept. 30, 1959
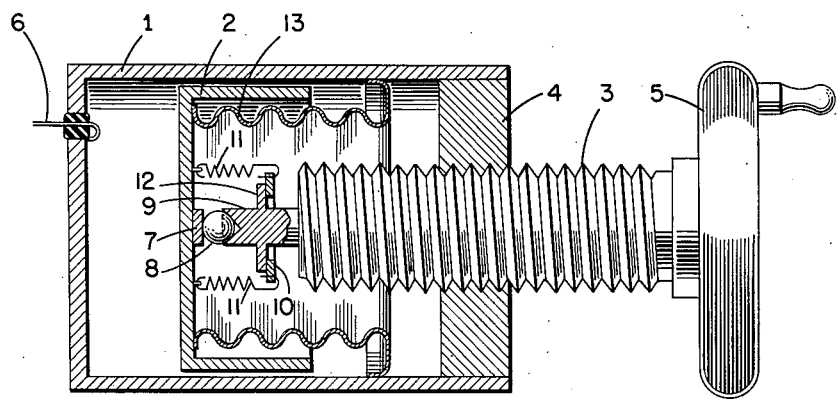
INVENTOR
Robert C. Hilliard
BY
ATTORNEYS

United States Patent Office 3,036,281
Patented May 22, 1962

3,036,281
WAVE METER DRIVE MECHANISM
Robert C. Hilliard, Beverly Farms, Mass., assignor, by mesne assignments, to the United States of America as represented by the Secretary of the Navy
Filed Sept. 30, 1959, Ser. No. 843,607
2 Claims. (Cl. 333—83)

This invention relates, generally, to a cavity type adjustable resonator and, more particularly, to a drive mechanism and a sealing element for the plunger of a wave meter.

Wave meters and resonant cavities in general, in some instances, employ a tuning plunger adjustable axially in a cylinder. For adjusting the plunger relative to the closed end of the cylinder to increase or decrease the length of the cavity a micrometer head is operatively connected to the plunger. Thus, when, by adjusting the micrometer, resonance is obtained for the particular wave length being measured, as indicated in an associated circuit, the position of the plunger as indicated on the micrometer head for such frequency is noted and recorded for subsequent use.

Heretofore, such wave meters have been expensive to manufacture because very high precision machining and tooling was required in order to guarantee the maintenance of a high vacuum in the resonant chamber and to insure alignment of the plunger and drive screw. The difficulty in taking up the looseness in the operative connections between the plunger and the head has also been troublesome.

The present invention avoids the disadvantages of the prior art by providing an improved drive mechanism and sealing element for the plunger of a wave meter. More specifically, there has been provided a spring connection between the plunger and the drive screw. This spring is connected to permit it to assume a constant length regardless of the movement of the plunger and drive elements. Thus, a constant constraining force is maintained between the plunger and the drive screw to eliminate all looseness between the connecting elements of the plunger and the drive screw.

Another feature of the invention is the provision of a bellows seal connected between the plunger and the chamber casing. This seal prevents communication between the chamber and its exterior.

With the foregoing in mind, an object of the invention is to provide an improved wave meter of high accuracy which is relatively inexpensive to manufacture.

Another object of the instant invention is to provide an improved wave meter of high accuracy wherein relatively crude machining of parts is permitted.

Still another object of the present invention resides in the provision of an improved wave meter wherein a seal is used between the plunger and the chamber wall.

A further object is to provide an improved wave meter wherein a means is placed between the plunger and the drive element to urge the plunger toward the drive element.

An additional object of the improved wave meter is to minimize the effects of errors of misalignment and concentricity of the drive mechanism on the position and orientation of the plunger.

Other objects and many of the attendant advantages of this invention will be readily appreciated as the same becomes better understood by reference to the following detailed description when considered in connection with the accompanying drawing wherein the figure is a cross-sectional view of the wave meter of the invention.

Referring now to the drawing the improved wave meter comprises a casing 1 having a plunger 2 slidably positioned therein, a drive screw 3 extending through a nut 4, which forms one end of the casing or chamber 1, and having a micrometer head adjusting wheel 5 on the outer end thereof, an electrical coupler 6 protruding into the end of cavity or chamber 1, and a thrust anvil 7 fixed upon the plunger 2. The drive screw 3 has a notched end 9 wherein ball coupling 8 rests. Springs 11 are connected on one end to the plunger 2 and on the other end to a thrust bearing 10 which rests on thrust collar 12. Bellows 13 is connected on one end to plunger 2 and on the other end to the chamber 1.

The plunger 2 is constructed to freely slide within the cylinder 1 so that the orientation of the plunger is determined solely by the bearing surfaces between the plunger and the internal cylinder wall. The force required for positioning the plunger axially within the cylinder is transmitted from drive screw 3 through the coupling assembly including elements 7, 8, 9, 10, 11, and 12.

As the wheel 5 is rotated in one direction the drive screw 3 advances into the cavity and transmits its motion through the bearing socket 9, ball coupling 8, and thrust anvil 7 to the plunger 2. On reversing the rotation of the wheel the motion of the drive screw is reversed and a thrust is applied through the thrust collar 12, the thrust bearing 10, and the bearing springs 11 to drag the plunger in the same direction. The tension of the bearing springs 11 is adjusted so that it exerts a force on the bearing and collar greater than that arising from the frictional and other forces exerted on the plunger. With this adjustment the ball 8 will always be under pressure and an exact fixed distance will be maintained between the bearing socket of the drive screw and the anvil on the plunger. Since the springs 11 are connected to the plunger 2 and the collar 12 it maintains a substantially constant length and thus exerts a substantially constant pressure on the ball 8 assuring a fixed distance between the socket 9 and the anvil 7.

By the foregoing arrangement, a parallel displacement of the drive screw from the axis of the cylinder due to an initial machining error in locating the center of the nut 4 will not subject the mechanism to any strain or attendant incremental positioning error because the thrust anvil and collar do not constrain such displacement. Furthermore, a nonparallel tilt of the drive screw with respect to the axis of the cylinder will also be tolerated with a minimum of strain and constraint since the ball is free to slide and rotate on the anvil. The bearing springs will accommodate both displacement and tilt. Thus, it is readily apparent that wide-range tuning is available with a relatively inexpensive device.

The ball and thrust bearing coupling between the plunger and the drive screw prevents the plunger from rotating as the drive screw is turned. A bellows type hermetic seal may therefore be used between the plunger and the cylinder thus permitting relatively rough machining of the cylinder and plunger walls.

Obviously many modifications and variations of the present invention are possible in the light of the above teachings. It is therefore to be understood that within the scope of the appended claims the invention may be practiced otherwise than as specifically described.

What is claimed is:

1. A device for providing wide range reference cavity tuning comprising a closed cylindrical chamber, a plunger contained within and slidable along the longitudinal axis of said chamber to form a variable resonant cavity, an anvil affixed to one side of said plunger, a drive screw threaded through one end wall of said chamber and having a notched end portion, a radially extending flange formed on said drive screw adjacent the notched end portion thereof, a ball positioned in the notched end portion of said drive screw and against said anvil whereby longitudinal movement of said drive screw in one direction is communicated to said plunger, a thrust bearing positioned for intimate sliding contact with said flange and a plurality of springs connecting said thrust bearing to said plunger whereby longitudinal movement of said drive screw in the opposite direction is communicated to said plunger.

2. The device as claimed in claim 1 which further comprises a bellows seal having one end connected to said plunger and the other end connected to said chamber.

References Cited in the file of this patent

UNITED STATES PATENTS

| | | |
|---|---|---|
| 2,752,576 | Hilliard | June 26, 1956 |
| 2,777,968 | Kenyon | Jan. 15, 1957 |
| 2,907,962 | Jaffe | Oct. 6, 1959 |
| 2,911,602 | Hayter | Nov. 3, 1959 |
| 2,933,684 | Selby | Aug. 12, 1960 |